US007243089B2

(12) United States Patent
Becker-Szendy et al.

(10) Patent No.: US 7,243,089 B2
(45) Date of Patent: Jul. 10, 2007

(54) SYSTEM, METHOD, AND SERVICE FOR FEDERATING AND OPTIONALLY MIGRATING A LOCAL FILE SYSTEM INTO A DISTRIBUTED FILE SYSTEM WHILE PRESERVING LOCAL ACCESS TO EXISTING DATA

(75) Inventors: Ralph Attila Becker-Szendy, Los Gatos, CA (US); Miriam Sivan-Zimet, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 10/723,750

(22) Filed: Nov. 25, 2003

(65) Prior Publication Data

US 2005/0114291 A1    May 26, 2005

(51) Int. Cl.
G06F 17/30 (2006.01)
G06F 17/00 (2006.01)
G06F 12/00 (2006.01)

(52) U.S. Cl. ............... 707/1; 707/10; 707/104.1; 707/200

(58) Field of Classification Search ........... 707/200, 707/1, 10, 104.1
See application file for complete search history.

(56) References Cited

U.S. PATENT DOCUMENTS

| 5,367,698 A * | 11/1994 | Webber et al. ......... 709/203 |
| 5,819,292 A | 10/1998 | Hitz et al. ............ 707/203 |
| 6,457,130 B2 | 9/2002 | Hitz et al. ............ 713/201 |
| 6,938,039 B1 * | 8/2005 | Bober et al. ............ 707/8 |
| 7,024,427 B2 * | 4/2006 | Bobbitt et al. ......... 707/200 |
| 2002/0083120 A1 | 6/2002 | Soltis .................. 709/200 |
| 2003/0078946 A1 * | 4/2003 | Costello et al. ....... 707/201 |
| 2003/0191838 A1 * | 10/2003 | Tsao .................. 709/225 |
| 2004/0030731 A1 * | 2/2004 | Iftode et al. .......... 707/205 |
| 2004/0193630 A1 * | 9/2004 | McLauchlin ........... 707/100 |
| 2004/0210644 A1 * | 10/2004 | Prust .................. 709/219 |
| 2004/0255048 A1 * | 12/2004 | Lev Ran et al. ........ 709/249 |
| 2005/0015384 A1 * | 1/2005 | Wehrman et al. ....... 707/100 |
| 2005/0021502 A1 * | 1/2005 | Chen et al. ............ 707/2 |
| 2005/0044162 A1 * | 2/2005 | Liang et al. .......... 709/212 |
| 2005/0226059 A1 * | 10/2005 | Kavuri et al. ........ 365/189.05 |

* cited by examiner

Primary Examiner—Don Wong
Assistant Examiner—Thanh-Ha Dang
(74) Attorney, Agent, or Firm—Samuel A. Kassatly

(57) ABSTRACT

Indirect access to local file systems is provided using storage tank protocols, allowing federation of a local file system into a distributed file system while preserving local access to the existing data in the local file system. The goal of the present system is to federate and migrate the data on a computer system with minimum disruption to applications operating on the computer system. Existing applications on a computer system continue to operate during data federation and migration and require little or no reconfiguration either when the data migration starts or when it ends. Data consistency is maintained: existing applications may modify data in the file system during migration or federation. During federation, other computer systems (or hosts) may modify the data in the file system if access control information allows them to do so. All changes in the file system are seen consistently on all hosts. Minimal downtime is required to install the present system and reconfigure the existing applications to communicate with the present system.

35 Claims, 9 Drawing Sheets

400

```
┌─────────────────────┐
│ VERIFY THAT COMPUTER│
│ SYSTEM HAS NETWORK  │─╮
│     CAPABILITY      │ │
└──────────┬──────────┘ │
           │           405
           ▼
       ╱───────╲         ┌──────────┐
      ╱         ╲   No   │ INSTALL  │
     ╱NETWORKABLE╲──────▶│ NETWORK  │
     ╲     ?     ╱       │ HARDWARE │
      ╲         ╱        │   AND    │
       ╲───┬───╱         │ SOFTWARE │
        Yes│  410        └────┬─────┘
           │                  │ 415
           ▼                  │
┌─────────────────────┐       │
│  INSTALL VIRTUAL    │◀──────┘
│ META-DATA SERVER    │
│ AND VIRTUAL OBJECT  │
│   STORAGE DEVICE    │─ 420
└──────────┬──────────┘
           ▼
┌─────────────────────┐
│ INSTALL STORAGE TANK CLIENT │─ 425
└──────────┬──────────┘
           ▼
┌─────────────────────────────┐
│ TEMPORARILY DISCONNECT APPLICATIONS │─ 430
└──────────┬──────────┘
           ▼
┌─────────────────────────────────────┐
│ CONFIGURE VIRTUAL SERVERS TO COMMUNICATE │
│     WITH STORAGE TANK SYSTEM             │─ 435
└──────────┬──────────────────────────┘
           ▼
┌─────────────────────────────────────┐
│ RECONFIGURE APPLICATIONS TO COMMUNICATE │
│       WITH STORAGE TANK CLIENT          │─ 440
└─────────────────────────────────────┘
```

FIG. 4

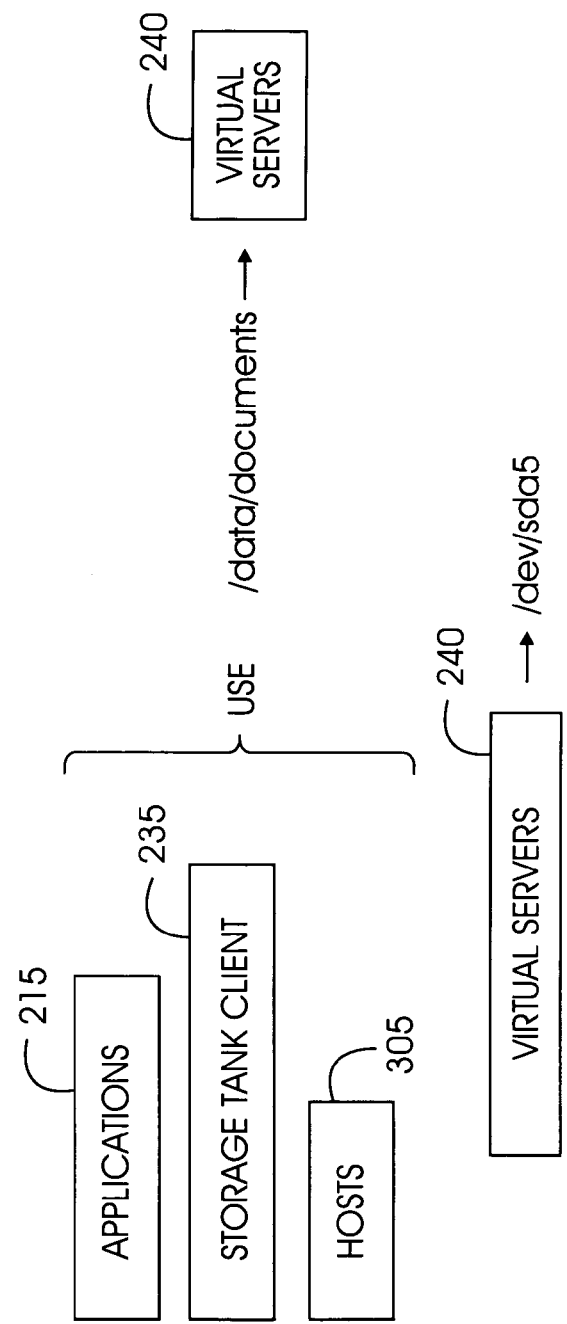

SYSTEM, METHOD, AND SERVICE FOR FEDERATING AND OPTIONALLY MIGRATING A LOCAL FILE SYSTEM INTO A DISTRIBUTED FILE SYSTEM WHILE PRESERVING LOCAL ACCESS TO EXISTING DATA

FIELD OF THE INVENTION

The present invention generally relates to federating an existing computer system into a federation of computer systems and optionally migrating the data from the existing computer to the computer systems within the federation. More particularly, this invention pertains to a method for federating and optionally migrating data using virtual servers and a federating file system on the existing computer system.

BACKGROUND OF THE INVENTION

As businesses or organizations upgrade their computer systems, they are often left with critical data on legacy systems. The business or organization may be only upgrading their data storage system, yet the process of transferring or migrating the data from the old system to the new system may require many hours of downtime for the computer system. In many applications, this downtime is unacceptable because the data and applications using the data are critical to the business or organization. In other applications, the downtime is costly, representing lost revenue to the company, for example.

Deploying a new storage technology entails many challenges; the new storage system should be easy to set up and should seamlessly integrate with the existing file system data. The new storage technology should allow data to migrate into the new system in an incremental fashion or leave the data on-line in the old system. Incremental migration should not disrupt applications that are operating off the local file system data. Migration of data from one system to another or one storage device to another should be an automated task with minimum system downtime.

Present global-scale storage systems provide data sharing, wreplication, and migration between sites, but none of these present systems are focused on integrating heterogeneous systems. Exemplary present systems comprise AFS, Echo, DFS, Coda, and JetFile. Peer-to-peer systems have also been developed to migrate data from one system; these present systems comprise, for example, Oceanstore, CFS, Past, and FarSite.

Previous work that integrates heterogeneous storage sources focuses on a single client accessing multiple storage servers through a uniform protocol, for example network file system (NFS). A current version of the network file system manages data replication and migration support. Another attribute of network file system allows the user to access the file resource in a different location. However, the data is required to be migrated or replicated by the storage servers themselves. In addition, the virtual file system interface supports heterogeneous source being merged at a single client. These access-oriented or client-based examples provide access to heterogeneous sources, but do nothing to integrate data.

Another example of a system that is currently used to integrate heterogeneous storage sources is the SDSC Storage Resource Broker. The Storage Resource Broker is middleware that provides applications a uniform API to access heterogeneous distributed storage systems. However, the Storage Resource Broker does not provide system-to-system interaction and consequently may not ensure consistency of data in case applications access data directly by bypassing the Storage Resource Broker servers.

Another difficulty arises in introducing new file systems to a system with an existing file system, for example, introducing a distributed file system. A distributed file system is one that runs on more than one computer. For example, company XYZ has computers for each of its employees, and all the file systems of the computers are interconnected in such a way that all the employees can access everyone else's files in the same place at the same name with the same content at any given moment. The computer network of company XYZ is referenced as computer XYZ. All the employees see the same file system but the file system itself runs on each one of the employee's computers. In this example, the data is stored in such a fashion that all the employees can access it. Company XYZ acquires a new company, company ABC. Company ABC has its own computers and data pertaining to the new company, such as payroll, etc. In addition, company ABC is web-based, selling products over the Internet. The computer system of company ABC is referenced as computer ABC.

Company XYZ wishes to move the data from the file system of the computer ABC, or at the least make the file system of computer ABC accessible to computer XYZ. The typical method for transferring the data from the computer of company ABC to the computer of company XYZ would be to backup the data on computer ABC, shut computer ABC, and copy all the data to the computer XYZ. This may take many hours, causing the web-based business of company ABC to be off-line for those hours. This is a very costly and time-consuming procedure.

What is therefore needed is a system, a service, a computer program product, and an associated method for federating an old system into a new system, and optionally migrating data from an old system to a new system. This method should operate seamlessly and efficiently with minimum disruption to existing applications running on the system. Further, this method should ensure data consistency for existing applications while making the data available for migration in a federated system. The need for such a solution has heretofore remained unsatisfied.

SUMMARY OF THE INVENTION

The present invention satisfies this need, and presents a system, a computer program product, and an associated method (collectively referred to herein as "the system" or "the present system") and a service for federating a local file system into a distributed file system (FS), while preserving local access to the existing data in the local file system. The present system may provide indirect access to local file systems using protocols such as, for example, storage tank protocols, object-based storage protocols, block-based protocols, etc. The server-based design of the present system allows systems to migrate their data and share the management of data. The data is federated, or made available to various clients by making it on-line to each client. The present system may be used with any file system protocol that supports migration, consistency and multi-host federation.

For purposes of illustration, the use of the present system is described in terms of a storage tank system. Storage tank is a distributed file system built on a storage area network.

Data may be stored either in block storage devices or object storage servers. Unlike most file systems, meta-data and data are stored separately in the storage tank system. The server manages meta-data comprising the location of the blocks of each file/object on shared storage. Object storage servers enable the creation of self-managed, heterogeneous, shared storage by offering a higher-level storage abstraction in the form of objects One goal of the present system is to federate and optionally migrate the data on a computer system with minimum disruption to applications operating on the computer system. The introduction of the present system to the computer system should be as transparent as possible, without changing the data and while preserving the semantics of accesses to the data. Existing applications on the computer system continue to operate during data federation and migration by the present system. Existing applications on the computer system require little or no reconfiguration either when the data migration starts or when it ends.

Data consistency is maintained in that existing applications may modify data in the file system during migration or federation. During federation, other computer systems (or hosts) may modify the data in the file system if access control information allows them to do so. All changes in the file system are seen consistently on all hosts. Minimal downtime is required to install the present system and reconfigure the existing applications to communicate with the present system Previous efforts to integrate heterogeneous storage sources have allowed only the clients access to data in multiple storage servers through a common protocol. The present system is a server-based solution to federation of local file system data that uses a detour through virtual storage servers. Federation involves integration of the local file system with a distributed file system or shared-disk cluster file system (also referenced herein as new file system or new FS). Through federation, data on the old file system is made available on-line such that it can easily be migrated to the new FS Consequently, system downtime is related to installing the new FS rather than migrating data, resulting in much shorter downtimes than present technologies provide.

As a result of integration, the local file system becomes a node in the cluster file system and exposes local data through the cluster file system protocol. The data may remain in the local file system until a decision is made to migrate the data to the new FS. Consequently, integration of the local file system with the cluster file system addresses on-line sharing of persistent data between heterogeneous file systems.

An embodiment of the federation design of the present system relies on object storage servers. The present system creates a virtual storage tank server and a virtual object storage server on top of the local file system to make the local file system appear as both a storage tank node and an object based storage server to a storage tank system. Data accesses go through the virtual object storage server, and not through the virtual storage tank server. It should be clear that the storage tank server provides metadata information to the client, who then accesses the data directly from the object based storage server. Storage tank uses the object storage server interface to access the local file system data. After the local file system is exposed through the storage tank file system, data may be left on-line and stored in the local file system or migrated to a new storage device through storage tank tools. While the present system is described in terms of storage tank, it is not limited to storage tank and may be expanded to other file systems.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 4 is a process flow chart illustrating a method of installing the data federation and migration system of FIG. 2 within a computer system;

FIG. 7 is comprised of FIGS. 7A and 7B and represents a diagram illustrating the namespace in a conventional computer system and a computer system utilizing the data federation and migration system of FIG. 2.

DETAILED DESCRIPTION OF PREFERRED EMBODIMENTS

The following definitions and explanations provide background information pertaining to the technical field of the present invention, and are intended to facilitate the understanding of the present invention without limiting its scope:

Kernel: A computer operating system, or kernel, is a software layer that sits between the computer hardware and the application software.

Metadata: data about data. Metadata is definitional data that provides documentation of or information about other data managed within an environment or by an application. In a file system, metadata comprises the directory tree and the attributes of objects such as files and directories. The directory tree is a set of names that are arranged in directories, forming a tree structure. Typical attributes comprise time stamps (i.e., time created, time last modified, time last read) and security related attributes (i.e., the identity of the owner of the object and a description of what the owner or other parties may do to the object).

POSIX: Acronym for Portable Operating System Interface for UNIX, a set of IEEE and ISO standards that define an interface between application programs and operating systems. For the data federation and migration system, the relevant part of POSIX is the interface between applications and the file system part of the operating system.

Storage Tank: A SAN based distributed or cluster file system that works on top of any network attached shared storage, including both block-based and object-based storage, where SAN references a storage area network. A SAN is a network system that is logically (but not necessarily physically) separate from the usual network layer used for remote access to computers or for internetworking. The SAN allows all the multiple computers that comprise the storage tank cluster to access the same storage devices. The opposite of SAN-connected storage is direct attached storage (DAS) where each storage device can only be used by the one computer to which it is connected.

Figure 1:
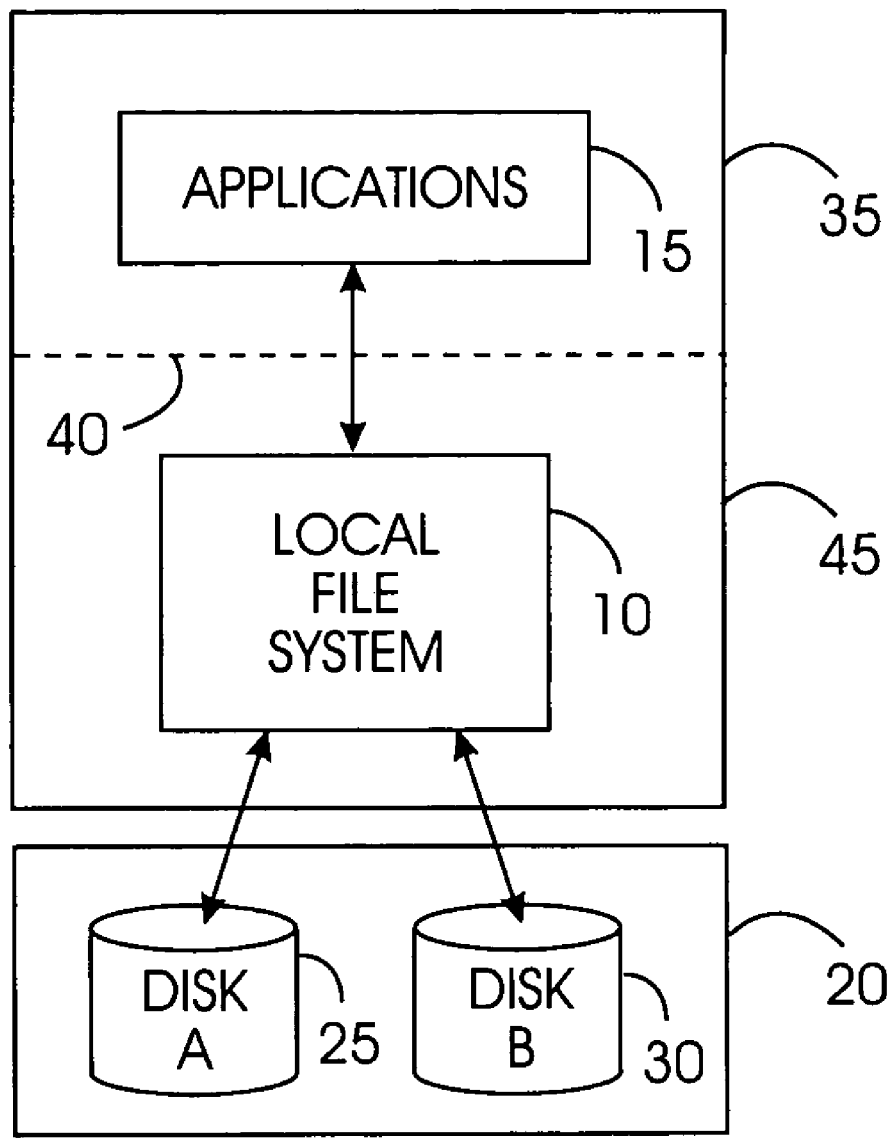
FIG. 1 is a schematic illustration of a conventional computer system illustrating the communication between applications and a local file system.

FIG. 1 illustrates a standard technology computer system 100 that utilizes a local file system 10. Typically, the local file system 10 is part of the operating system and performs as the middleware between applications 15 and a storage system 20. The storage system 20 may comprise, for example, disk drives such as a disk drive A, 25, and a disk drive B, 30. The local file system 10 provides file services, file structure, etc. to the applications 15 on top of the storage system 20. File services typically comprise creating a file, finding a file in a directory, reading from a file, etc. Commands from applications 15 are interfaced to the local file system 10. The local file system 10 contains all the metadata required to access the blocks on the disk drive A, 25, and the disk drive B, 30, in the storage system 20.

Applications 15 operate in a user space 35 (above a dotted line 40) while the local file system 10 operates in a system space 45, also referenced as kernel space 45 (below the dotted line 40). The local file system 10 gets commands from applications 15. Exemplary commands might be "create a new file", or "find a file in a directory, then open the file and read it". The complexity of the storage space 20 is hidden from applications 15 by the local file system 10. The interface between the local file system 10 and the storage space 20 is very simple, for example, "read one block" or "write one block". The local file system 10 takes complex instructions from applications 15 and converts them to the very simple operations that may be executed by the storage space 20. The purpose of the local file system 10 is to take all the common operations of storage space 20 out of applications 15.

Figure 2:
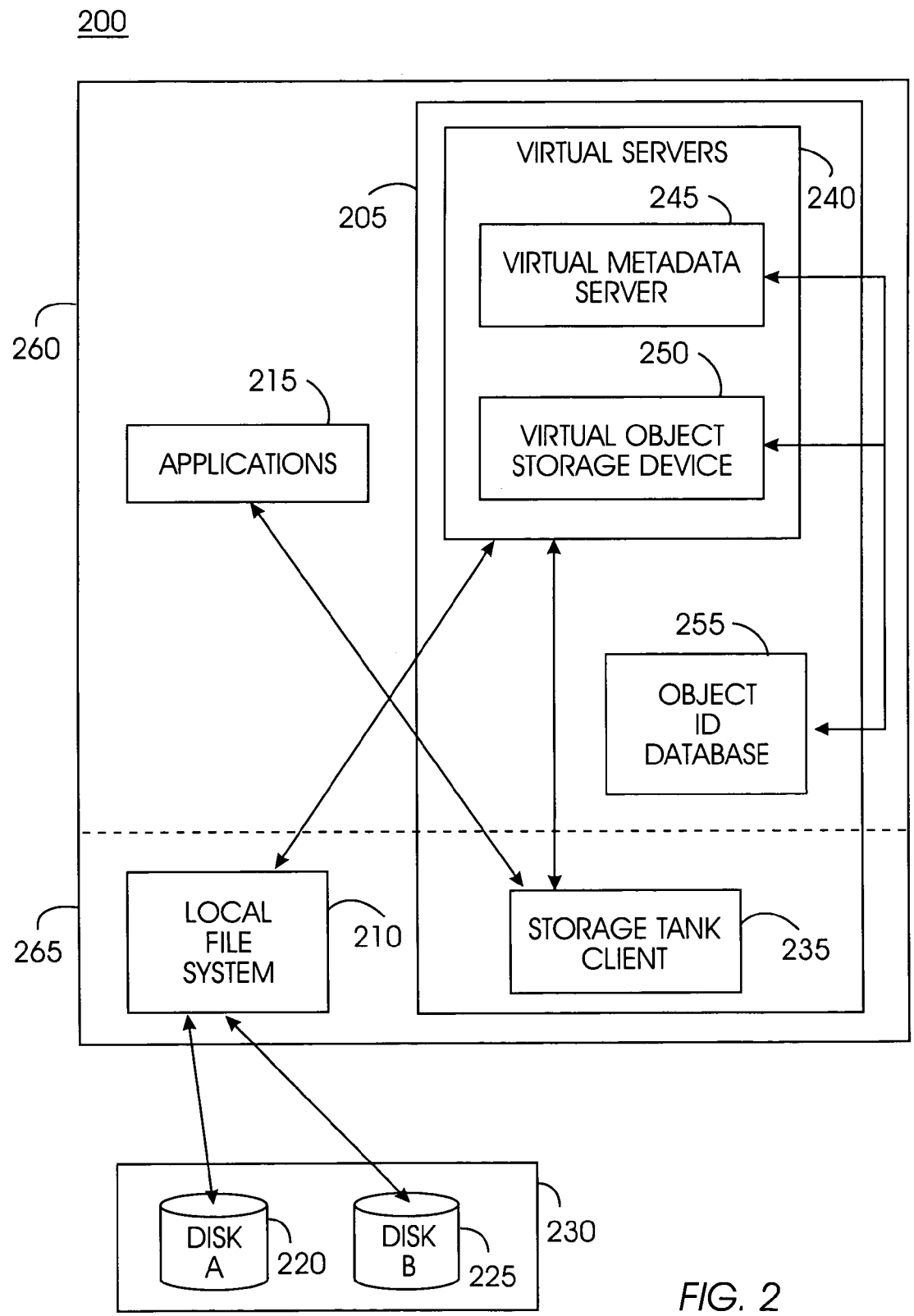
FIG. 2 is a schematic illustration of an exemplary operating environment in which a data federation and migration system of the present invention can be used.

FIG. 2 illustrates an exemplary overall environment, a computer system 200, in which a system, service, and associated method for providing a system and method for federating a local file system into a distributed file system while preserving local access to the existing data in the local file system according to the present invention may be used. System 205 includes a software programming code or computer program product that is typically embedded within, or installed on the computer system 200. Alternatively, system 205 can be saved on a suitable storage medium such as a diskette, a CD, a hard drive, or like devices.

System 205 converts a local file system 210 to a storage tank metadata server (MDS) and an object storage server. System 205 is federation layer installed in computer system 200 that establishes a detour between the local applications and the local file system that provides access to a distributed mechanism or a network. For exemplary purposes only, a storage tank system is used to illustrate the distributed mechanism or network.

In FIG. 1, applications 15 communicate directly with the local file system 10 and the local file system 10 communicates directly with the storage space 20. After the installation of system 205, applications 215 communicate with the storage tank client 235, the storage tank client 235 communicates with the virtual servers 240, the virtual servers 240 communicate with the local file system 210, and the local file system communicates with a disk A 220 and a disk B 225 in a storage space 230.

System 205 is comprised of virtual servers 240 and a storage tank client 235. The virtual servers 240 are comprised of a virtual metadata server 245 and a virtual object storage server 250. The virtual metadata server 245 is a specially modified storage tank metadata server. In addition to the standard method for storing metadata, the virtual metadata server 245 may also use the local file system 210 to read or write metadata. The virtual object storage server 250 also uses the local file system 210 to read or write data. The virtual servers 240 share an object ID database 255.

Installation of the virtual servers 240 converts the computer system into a storage tank server and an object-based storage server. The virtual servers 240 and applications 215 operate in a user space 260. If desired for performance issues, the virtual servers 240 may be installed in a system space 265, also referenced as a kernel space 265. The local file system 210 and the storage tank client 235 operate in the kernel space 265. System 205 has all the tools necessary to federate and migrate data. Consequently, data on the storage space 230 is now federated, available to all the computers within the federation system, and the data may be migrated to one or more of the computers in the federation system.

System 205 utilizes a virtualization aspect of mounting a file system 10. For example, a local file system is stored in a locally attached disk. That locally attached disk can be mounted anywhere in the name tree of the file system. Another file system can be mounted where the old file system was originally mounted. The same logic applies when mounting a non-local file system, such as storage tank, implemented in the kernel space 265. Above the virtual file system (VFS) layer, each layer of the kernel-related system call is matched to the appropriate file system and is routed accordingly. For example, the file/data/my.data could have been on a floppy yesterday, on a locally attached IDE disk today, and on storage tank tomorrow, all without the user process (application) being aware of the file system being changed. It should be clear that by installing system 205, the local application access to the local file system data is not only maintained, but the local file system data is also made available to other storage tank clients on other systems even if the data is not migrated.

System 205 exposes the local file system 210 as part of a storage tank file system and introduces a communications detour within computer system 200. Diverting communication through system 205 allows system 205 to expose the local file system 210 as part of a storage tank file system, making all the data on the storage space 230 available for migration and federation. The computer system 200 can continue to operate as before, except that the communication path is now through system 205. The only down time experienced by the computer system 200 is for the installation of system 205. Applications 215 may still access data in the storage space 230. Migrating data to a new system through system 205 may now be performed at whatever pace is desired. The effect on the computer system 200 is slower processing speed.

A fundamental requirement for system 205 is a distributed file system that uses a protocol that supports virtualization (that is, redirection), and migration if needed, and that can be used as an interposer between the local FS and the local applications. In one embodiment of system 205, a distributed file system protocol is used comprising the storage tank protocol for the metadata and the object based storage protocol for the data.

Figure 3:
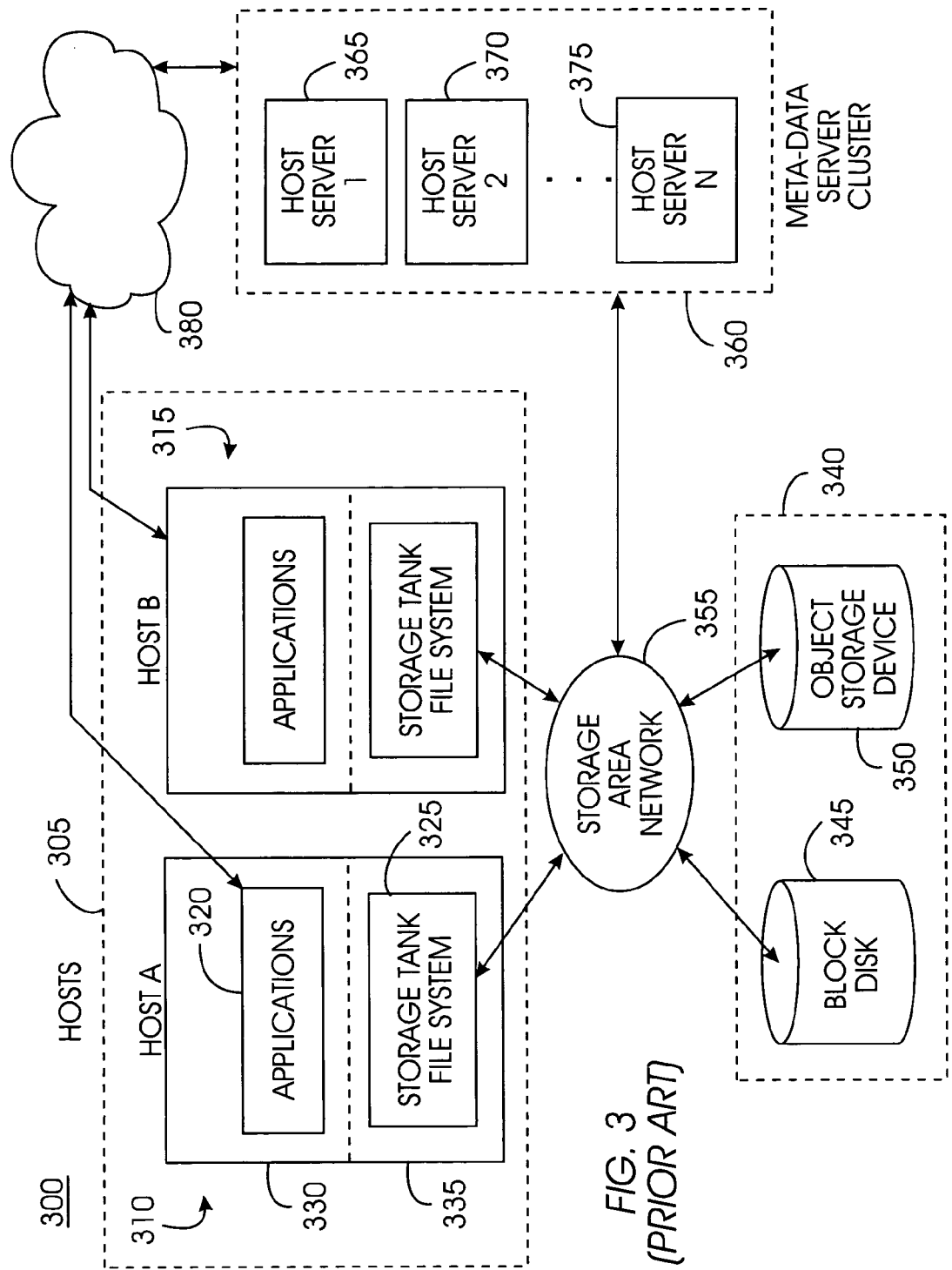
FIG. 3 is a schematic illustration of a conventional storage tank system with which a computer system using the data federation and migration system of FIG. 1 may communicate.

FIG. 3 is a block diagram of the high-level architecture of a storage tank system 300. The storage tank system 300 typically has multiple hosts 305 such as host A 310, and host B 315. Each host 305 is comprised of applications and a storage tank file system. For example, host A 310, is comprised of applications 320 and a storage tank file system 325 (also referenced as storage tank client 325). Applications 320 operate in a user space 330. The storage tank file system 325 operates as a file system on the operating system of host A 310, in system space 335, also referenced as kernel space 335. Hosts 305 have access to storage devices 340 such as the block disk 345 and an object storage server 350 via a storage area network 355. The storage area network 355 connects the storage devices 340 to hosts 305 and a metadata server cluster 360. System 205 presents the computer system 200 as a storage tank file system to the storage tank system 300.

The storage tank system 300 is a distributed storage system built on the storage area network 355. In the storage tank system 300, several types of items may be stored in the storage tank file system 325 and the local file system 210: files, directories, soft links, device nodes, etc. The term "file name" is used to refer to the path string that is used in both the local file system 210 and the storage tank system 300 to locate an object. The file name is made up from directory names (usually separated by slashes), and the actual file name at the end.

The term "disk" references the actual storage device, whether it is an individual disk (attached via DAS or SAN), or a logical unit on a disk array. Disks that are used by the storage tank system 300 are attached via a SAN. The SAN may be comprised of, for example, fiber channel, iSCSI, etc. A disk that partitions its storage space into many objects is an object store device, also referenced as an object based store. The traditional disk is called a block disk. The storage tank system 300 can use both traditional block disks, as well as object store devices to store the contents of files.

File data is the bytes that are actually stored in a file. Metadata is all the rest of the information stored in a file system. Metadata comprises the directory tree and the attributes of objects such as files and directories. The directory tree is a set of names that are arranged in directories, forming a tree structure. Typical attributes comprise time stamps (i.e., time created, time last modified, time last read) and security related attributes (i.e., the identity of the owner of the object and a description of what the owner or other parties may do to the object). In addition, with object based storage, it is possible to have some of the metadata stored on the object based storage. For example, object based storage manages the block mapping internally, off-loading this role from the file system.

Data may be stored either in block storage devices (block disk 345) or object storage servers (object storage server 350). Unlike most file systems such as the local file system 210, metadata and data are stored separately by the storage tank system 300. Metadata comprises such information as the location of the blocks of each file/object on shared storage. Metadata are managed by the metadata server cluster 360 and the blocks of data for the files/objects are stored in shared storage on the storage area network 355.

The metadata server cluster 360 is comprised of one or more servers such as host server 1, 365, host server 2, 370, through host server N, 375 (also referenced herein as servers 365, 370, 375). The metadata server cluster 360 stores the metadata used by the storage tank system 300. Hosts 305 communicate with servers 365, 370, 375 in the metadata server cluster 360 over a general-purpose network 380 to obtain file metadata. The metadata server cluster 360 also communicates with the storage devices 340 through the storage area network 355.

Hosts 305 perform I/O directly to shared devices on the storage area network 355. The metadata server cluster 360 provides distributed locking to enforce cache consistency. In addition, the metadata server cluster 360 provides high availability, increased scalability, and centralized automated storage and data management. Consequently, the storage tank system 300 employs very different technologies when compared with most traditional file systems.

The storage tank system 300 supports data disks such as the block disk 345. The block disk 345 is a disk that has addressable blocks. The storage tank system 300 is responsible for keeping track of where the data is located on the block disk 345 because it has no associated metadata. The storage tank system 300 also supports the object storage server 350. The location of a data block within the object storage server 350 has already been abstracted so that the metadata server cluster 360 does not need to know exactly where the data blocks are located, requiring less metadata. The object storage server 350 abstracts files or portions of files into an object of variable size with an ID number.

The design and operation of storage tank system 300 previously presented provides the method by which data on the computer system 200 may be federated and optionally migrated. System 205 presents the computer system 200 to the storage tank system 300 as if it were a storage tank metadata server such as host server 1,365. The virtual metadata server 245 takes the structure and layout information of the local file system 210 and serves it as storage tank metadata to the storage tank system 300. Adding the virtual metadata server 245 to the computer system 200 turns the computer system 200 into a storage tank metadata server that is accessible from and to any host 305 within the storage tank system 300.

The storage tank system 300 is distributed in such a fashion that both the data flow and the control flow go through networks such as general purpose network 380 and the storage area network 355; the data flow and control flow can thus easily be intercepted and modified. The data flow and control flow are separated into two entities, namely hosts 305 and the metadata server cluster 360. Hosts 305 are the consumers of data, the machines that use the file system such as storage tank file system 325 and in which applications such as applications 320 are running. The metadata server cluster 360 feeds hosts 305 with the metadata. It should be clear that separating networks 355 and 380 is a logical distinction; they could be physically implemented on the same hardware.

Figure 5A:
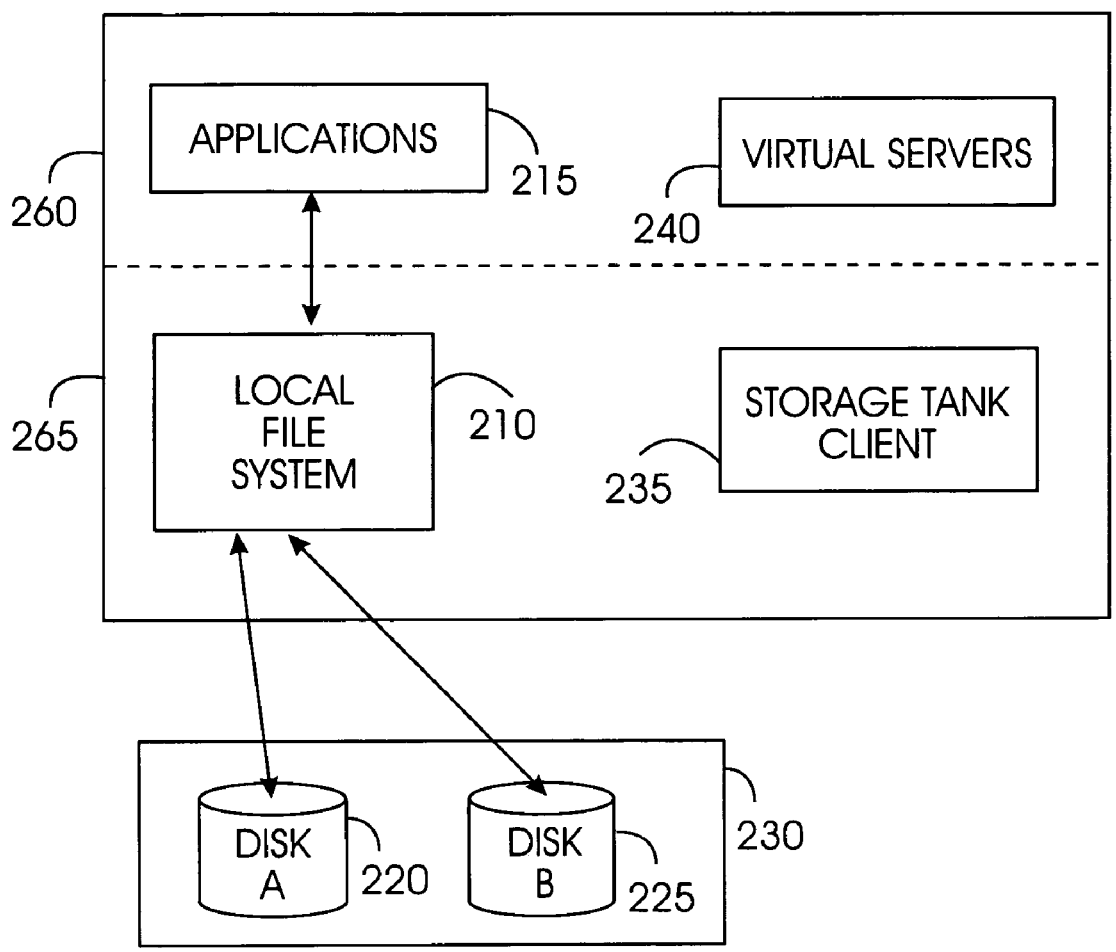
FIG. 5 is comprised of FIGS. 5A and 5B and represents a schematic illustration portraying a method of installing the data federation and migration system of FIG. 2 within a computer system with FIG. 5A showing the system before, and FIG. 5B showing the system after installing the data federation and migration system of FIG. 2.
Figure 5B:
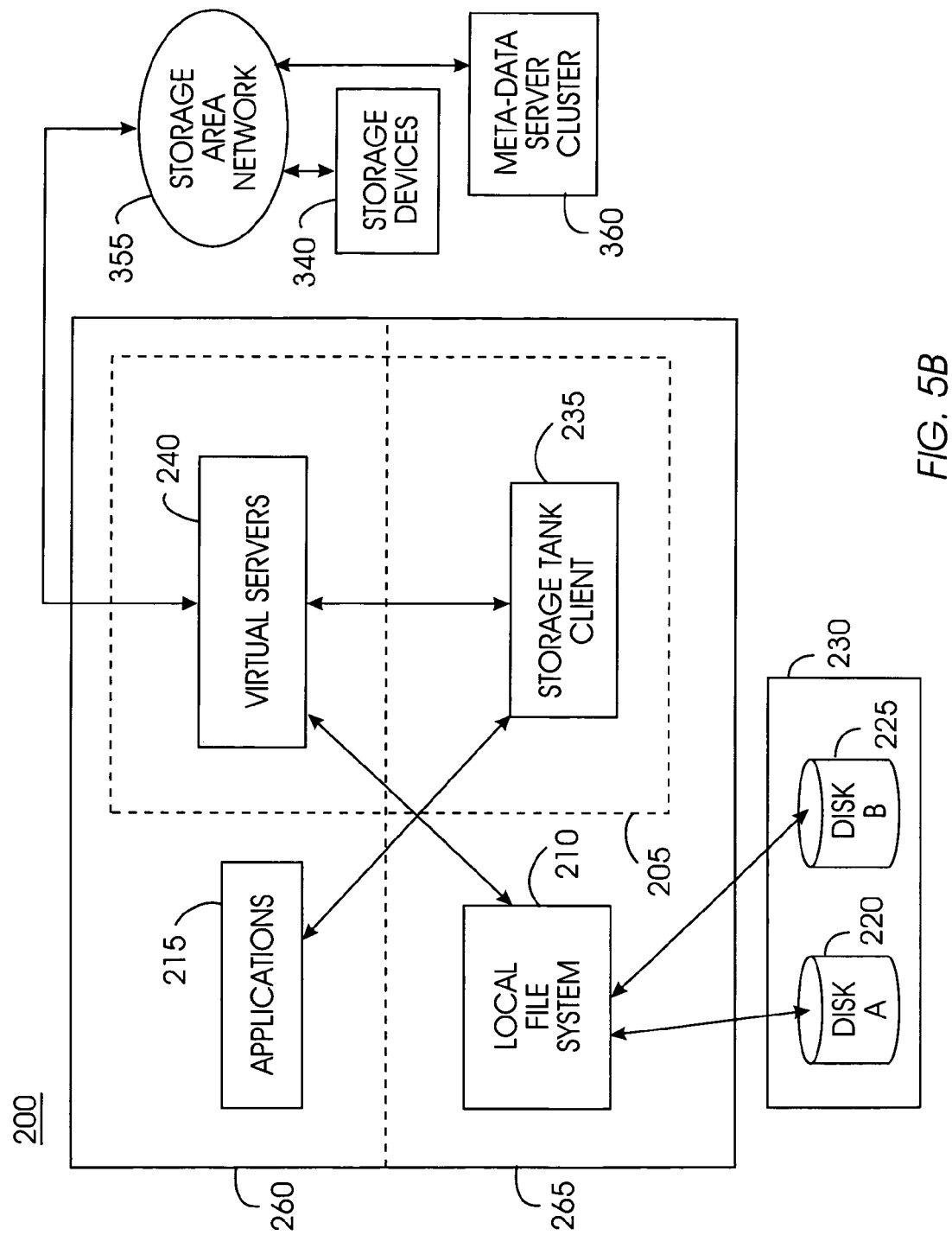

A method 400 for federating the computer system 200 is illustrated by the process flow chart of FIG. 4, with further reference to FIG. 5 (FIGS. 5A and 5B). A user such as a system administrator verifies that the computer system 200 has network capability at block 405. If the computer system 200 does not currently have network capability at decision block 410, the administrator installs networking hardware and software (for local area network (LAN) and SAN) as required, making computer system 200 network-capable at block 415 so that computer system 200 can communicate with the storage tank system 300 via the storage area network 355.

Temporary storage tank servers are installed in the user space 260 at block 420; these temporary storage tank servers comprise the virtual metadata server 245 and the virtual object storage server 250. The object ID database 255 may be installed concurrently with the server, or its creation may be deferred to the first file activity. The storage tank client 235 is installed in the system space 265 at block 425 (FIG. 5A); the storage tank client 235 is a type of file system. Installation of the storage tank client 235 requires connecting the computer system 200 to the distributed infrastructure that is needed for the new distributed file system, i.e., to make the computer system 200 a part of the storage tank system 300.

Application 215 is temporarily disconnected at block 430 and reconfigured to communicate with system 205 at block 440 (FIG. 5B), redirecting the local file system 210. For example, the local file system 210 is mounted at/data. At block 435, the virtual metadata server 245 and virtual object storage server 250 are configured to communicate with the storage tank system 300. The system administrator or installer would unmount file system 210 and mount it on a different place. For security reasons, the installer may decide to mount the local file system 210 at /olddata, for example.

The administrator configures the virtual servers 240 to use the local file system 210 at /olddata and configure the virtual servers 240 into a storage tank cluster. The administrator configures the fileset name under which the local file system 210 is to be exported to the storage tank system 300. A fileset is the term used by the storage tank system 300 to describe parts of the file system name tree; in the storage tank system 300, data migration is organized by fileset boundaries. Configuring the fileset name under which the local file system 210 is to be exported allows fileset migration.

The administrator configures the metadata server cluster 360 to recognize that this fileset is currently be served by the virtual metadata server 245. The administrator configures the storage tank client 235 to use the distributed infrastructure (LAN, SAN) that was previously configured.

Communication now flows from application 15 to system 205 to the local file system 210 and any host 305 in the storage tank system 300 that has access to data on the data store 230. The only down time experienced by application 215 is the time required to disconnect at block 435 and reconfigure at block 440; this down time may be on the order of minutes or less, for example.

Several options exist for mounting system 205 as a distributed file system, comprising: mounting system 205 in the usual place in the storage tank system 300 (i.e., tank/ clustername/migration); mounting the desired fileset "migration" directly (i.e.,/data); or mounting system 205 in the usual place in the storage tank system 300 (i.e., tank/ clustername/migration) and making a softlink from /data to /tank/clustername/migration. Mounting system 205 at tank/ clustername/migration reconfigures applications 215 to use that directory. Mounting system 205 at /data eliminates the need to reconfigure applications 215 but requires the computer system 200 to be configured in an unusual manner. Mounting system 205 at tank/clustername/migration with a softlink from /data to /tank/migration mounts system 205 in the usual place while preserving the current name space location for hard-to-change applications in applications 215.

The virtual metadata server 245 has a front-end similar to servers 365, 370, 375 in the metadata server cluster 360 that operates with the object storage server 350. The virtual metadata server 245 has a back-end that stores metadata and in the local file system 210 and shares the object naming with the virtual object storage server 250. File data is stored either on the local file system or on the general storage of storage tank system 300. The virtual metadata server 245 handles all the metadata transactions initiated by the storage tank client 235 at the local file system 219. The storage tank client 235 operates with the object storage server 350. A storage tank installable file system (IFS) version that supports data access through the object storage server 350 is installed in the local file system 210. Installing the IFS converts any computer system into a storage tank client 235. The virtual object storage server 250 is a storage server that stores the data content of files, each of which is associated with an object ID. The virtual object storage server 250 uses the local file system 210 to store objects. The front end of the virtual object storage server 250 is similar to a standard object storage server with the back-end replaced by POSIX file access calls. Consequently, the virtual object storage server 250 performs as an object storage server emulator running on top of the local file system 210.

Many of the system specific storage management functions such as data placement and allocation vary greatly in their implementation across different platforms. System 205 works in conjunction with the object storage server 350 because the object storage server 350 provides a much higher level of abstraction. This higher level of abstraction pushes platform specific low-level functions into the device or at the back end of the virtual object storage server 250. In addition, files and objects are semantically quite similar. Consequently, files can be mapped to objects on a one-to-one basis.

To maintain local access on the computer system 200 while operating as a storage tank client 235, the storage tank client 235 is positioned between the local file system 210 and the virtual metadata server 245. The storage tank server 250 ensures that data are consistent between the various storage tank clients such as storage tank clients 325 running on other computers. Having the computer system 200 use the storage tank client 235 incurs some overhead, as compared to the local file system 210, since the storage tank client 235 invokes the virtual metadata server 245 for locking and distributed consistency. The virtual object storage server 250 and the virtual metadata server 245 run against the local file system 210. The storage tank client 235 sends metadata requests to the virtual metadata server 245.

The storage tank client 235 gets a unique object ID from the virtual metadata server 245 that the storage tank client 235 can present to the virtual object storage server 250 to perform file I/O. In storage tank protocol, storage tank objects (i.e., directories, files, etc.) are identified by an object ID number (OID). System 205 generates these object ID numbers for existing objects in the local file system 210. There is one unique object ID number for each object in the local FS; the object ID number. The storage tank client 235 can cache the object ID numbers, but should do so in a consistent manner. The object ID number for an object should never change, even if other objects in the local file system 210 are created, deleted, or renamed.

As previously presented, data objects (which in this case are the data content of files) are also identified by an ID number in the protocol of the virtual object storage server 250. This ID number is referenced as the ObSOID. System 205 utilizes a one-to-one correspondence between files in the local file system 210 and ObSOIDs. Again, this mapping should be consistent and stable. Furthermore, the virtual metadata server 245 and the virtual object storage server 250 should agree on the numbering system for object ID numbers and ObSOIDs. Consequently, an embodiment of system 205 utilizes the same value for both object ID number and ObSOID, referenced simply as the object ID number of the object In the local file system 210, objects are accessed not by their object ID number but by their file names. System 205 provides a mapping from file name to object ID number, and a reverse mapping from object ID number back to the file name. This mapping is unambiguous and stable. System 205 implements the mapping by having the virtual metadata server 245 and the virtual object storage server 250 use the object ID database 255 that is shared between them. The object ID database 255 maps the file name to object ID number, and reverse maps the object ID number to a file name.

These object ID numbers have to be generated for each object in the local file system 210 that is accessed through the servers 240. An embodiment generates object ID numbers from a counter anytime a new object that has not been used before is accessed. This object ID number is entered, together with the file name, into the object ID database 255.

The local file system 210 provides an ID number for each object, namely the inode number. In another embodiment, that inode number is used for generating object ID numbers. The inode number has one of the previously presented properties required for an object ID number; i.e., while an object exists, it will always have the same inode number. However, the other requirement is not met; if an object is deleted and a new object is created, the new object might receive the inode number of the deleted object. Consequently, different objects may use the same inode number over time. To eliminate that issue, system 10 generates the object ID number from the inode number and a generation number. System 205 defines the object ID number as the tuple, <I, G>, where I is the inode number of the corresponding object in the local file system 210 and G is the generation number assigned by system 205.

The generation number G is used to construct a unique tuple <I,G> from the inode number, I. The first time the system encounters an inode number, it creates the tuple <I,0> by using the generation number zero. If a file system object is actually deleted, the corresponding object is marked with a "deleted" flag in the database to indicate that this inode number may be reused in the future. If a new file system object is to be created and the newly created file system object is found to have an inode number that is already known to the database, the new tuple is generated from the inode number, I, and the next sequential generation number G.

In a typical file system, one file may have multiple names also known as multiple hard links. In this case, multiple file names will share the same inode number. If this occurs, the object ID number database 255 should reflect this, with two file names sharing the same object ID number. The two file names refer to the same file, and have to share the same attributes. If the attributes of the file are changed using one filename, the attributes of the other file names must reflect that change. In addition, when the name to a file is unlinked the file is not actually deleted until the last hard link to that file is unlinked. Even when the number of hard links for a file has dropped to zero, the file will continue to exist in the storage tank system 205 while any locks on the file are active. Therefore, the file can only be actually deleted and the "deleted" flag in the object ID number database 255 set once the number of hard links to a file that has dropped to zero and the last lock on the file has been released.

When the virtual object storage server 250 needs to access an object, it knows the ObSOID number of that object, which is provided to it by the storage tank client 235. The virtual object storage server 250 uses the object ID database 255 to perform a reverse lookup and find the file name from the object ID number. By construction, the object ID number is the same as the ObSOID.

The presence of hard links may make the mapping from object ID number to the file name ambiguous. Consequently, the virtual object storage server 250 may be using a file under some name while the virtual metadata server 245 alters that ambiguous mapping. Because the two names (or hard links) actually refer to the same file system object, this poses no danger of causing inconsistencies. It does not matter which of the multiple file names the virtual object storage server 250 chooses to use.

For each object, system 205 stores a larger set of attributes than the local file system 210. For example, system 205 stores different versions of the file creation time for different operating systems used by hosts 305. In addition, system 205 stores a directory search key number for each directory entry. The virtual metadata server 245 stores these extra attributes of objects in the object ID database 255, in addition to the file name and object ID number mapping. Furthermore, the server may persistently store other information about objects, for example locks that have been granted.

When an application 215 wishes to modify the attributes of a file, the virtual metadata server 245 executes that modification by modifying the attribute of an object stored in the local file system 210. To improve performance, the virtual metadata server 245 may store such attributes in the object ID database 255, which may be more efficient than modifying the local file system 210. The virtual metadata server 245 may copy all the attributes of the object into the object ID database 255 the first time it accesses the object.

Deleting an object from the local file system also requires special handling. In the storage tank protocol, clients can continue to hold locks on objects after deleting the object (which in Unix language is known as unlinking the object). The term "deleting" an object refers to the action of unlinking the last name from the object (objects may have multiple file names, due to hard links). When locks on an object are released, the virtual metadata server 245 monitors whether objects need to be deleted and stores that information in the object ID database 255 as a "to-be-deleted flag". This "to-be-deleted" flag is distinct from the "deleted" flag. The "to-be-deleted flag" is set when the file is deleted but there is still one or more clients that hold locks. Only when there are no outstanding locks for the file can the file can be actually deleted from the local file system and marked as deleted in the database.

At this stage the existing local file system is successfully federated into the storage tank system. If the optional data migration is not desired, the task of federation is complete. Having integrated the storage tank system 300 and the local file system 210, data may be migrated incrementally using management tools of the storage tank system 300. The storage tank system comprises tools to migrate data between storage devices, and those devices will not be explained further here. Migration to the storage tank system 300 is transparent. Consequently, applications 215 see no service interruption as their data are migrated from the local file system 210 to the storage tank system 300.

Figure 6A:
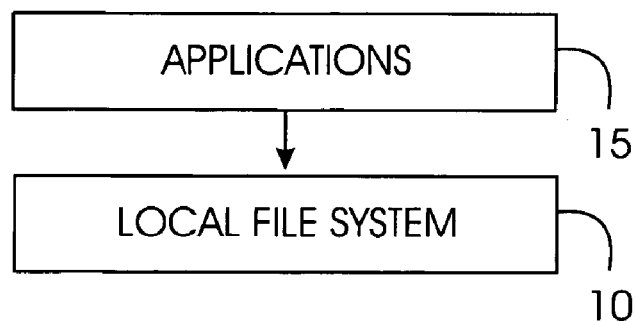
FIG. 6 is comprised of FIGS. 6A and 6B and represents a diagram illustrating the communication path in a conventional computer system and a computer system utilizing the introduced by the data federation and migration system of FIG. 2.
Figure 6B:
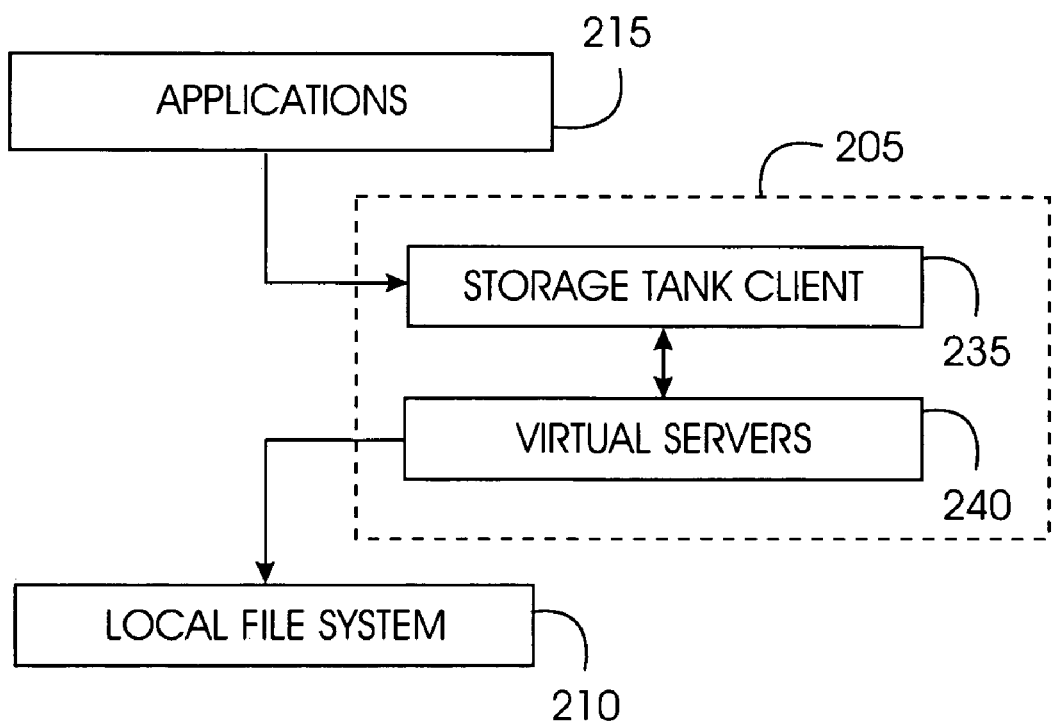

FIG. 6 (FIGS. 6A and 6B) is a diagram illustrating the communications path between applications 215 and the local file system 210. In a prior-art system shown in FIG. 6A, applications 15 communicate directly with the local file system 10. In FIG. 6A, an application 15 accesses the local file system 10 by making a file system I/O system call to kernel space 45. The code for the local file system 10 in kernel space 45 (including the buffer cache) then communicates with the storage space 20.

Using the data federation and migration system 205, applications 15 communicate with the storage tank client 235 in FIG. 6B. The storage tank client 235 communicates with the virtual servers 240. The virtual servers 240 communicate with the local file system 210. From the point of view of application 215, no change has been made. Application 215 still has access to data on the storage space 230 as before.

In FIG. 6B, while data is being migrated from the storage space 230 to the storage tank system 300, application 215 can still access its data by the indirect route illustrated. Application 215 makes a file system I/O system call to the kernel space 265 and the storage tank client 235 in the kernel space 265, including the buffer cache. The storage tank client 235 contacts the virtual metadata server 245 for the desired file via an internal network. The virtual metadata server 245 gets file metadata by accessing the local files system 210 at a different mount point and contacts the virtual object storage server 250 for the file data, again via the internal network. The virtual servers 240 then get the file data by accessing the local file system 210. If data has already been migrated then it is possible that another server will serve it, so the storage tank client will not use the local virtual server to access this data To access data in the storage space 230 before it has been migrated to the storage tank system 300, applications 215 make their file system I/O calls into the kernel space 265. The VFS layer in the kernel space 265 routes those calls to the storage tank client 235. The storage tank file system 325 separately manages metadata and data, and keeps a cached load map for each object in the storage tank file system 325 indicating which of the virtual servers 240 manages the metadata for that object. The storage tank client 325 performs metadata operations by communicating with the virtual server 240 in charge of the fileset. In this case, the virtual metadata server 245 may be the storage server for the storage tank fileset. The virtual metadata server 245 assigns storage tank identities to all the objects it finds in the local file system 210. The virtual metadata server 245 returns all the metadata information to the storage tank client 235 in the usual format, using the usual storage tank protocol. If the data is migrated, another server 360 will serve the data.

Having accessed the metadata, the storage tank client 235 may need to access the actual data of the files. The storage tank client 235 again contacts the virtual metadata server 245, asking permission to access the data and inquiring how to do so; i.e., the storage tank client 235 acquires a data lock. The virtual metadata server 235 performs normal storage tank server locking operations to coordinate accesses between multiple clients and preserve consistency of data and data caches. The virtual metadata server 245 then presents the storage tank client 235 with a data lock and data descriptor. The data descriptor informs the storage tank client 235 that to access the data, it shall access an object storage server and provides the contact information (IP address and port) of the virtual object storage server 250. The virtual metadata server 245 provides the contact information for the virtual object storage server 250, which acts as the object based server for the data in the storage space 230. If the data is migrated, the metadata server (either the virtual metadata server 245, or the final metadata server 360) will provide the storage tank client 235 with contact information for the storage device to which the data was migrated.

To read or write data in the storage space 230, the storage tank client 235 contacts the virtual object storage server 250. The virtual object storage server 250 executes these read and write operations by reading and writing the existing files through the local file system 210.

If application 215 wishes to modify the metadata of existing objects, the storage tank client 235 may contact the virtual metadata server 245 on behalf of application 215. The virtual metadata server 245 can then change the attributes of the existing files in the storage space 230. Alternatively, the virtual metadata server 245 may store the modified attributes in the object ID database 255. If application 215 wishes to create or delete objects, the storage tank client 235 may again contact the virtual metadata server 245 which performs these operations on the local file system 210.

Communications between the applications 215, the storage tank client 235, the virtual metadata server 245, the virtual object storage server 250, the local file system 210, and the storage space 230 generates a great deal of "network traffic" within the computer system 200. This network traffic occurs because the storage tank client 235 accesses the virtual metadata server 245 and the virtual object storage server 250 for both metadata and data accesses. The network traffic does not present a significant issue because typical modern operating systems short-circuit local network 10 and do not utilize network hardware. Alternatively, the storage tank client 235, the virtual metadata server 245, and the virtual object storage server 250 may be modified to use a more efficient communication mechanism. One such mechanism, for example, might be shared memory between the storage tank client 235 in the kernel space 265, the virtual metadata server 245, and the virtual object storage server 250. Another such mechanism for efficient communication might be to install the virtual servers 240 in the kernel space 265.

Applications 215 may still access a file after it has been migrated out of the local file system 210. Application 215 makes a file system I/O call to the kernel space 265. The storage tank client 235 contacts the metadata server for this file, which is now some remote server in the metadata server cluster 360 such as host server 1, 365. Host server 1,365, points the storage tank client 235 to the correct data disk where the file is stored, for example, the block disk 345 or the object storage server 350. The storage tank client 235 then contacts the appropriate data disk and reads or writes data.

For the purpose of file and data consistency, the direct path between applications 215 and the local file system 210 has been eliminated. File systems typically preserve one consistent view. One of the advantages of a storage tank system 300 is that the data obtained from it is always consistent, even with multiple storage tank clients (235 and 325 for example) accessing the storage tank system 300. While the system 205 is accessing data in the storage space 230, direct access by applications 215 to the data in the storage space 230 through the local file system 210 is disallowed to maintain data consistency. Otherwise, system 205 would be unable to inform the virtual storage tank client 235 or the storage tank system 300 about such changes and the caches on the storage tank client 235 and the storage tank system 300 (for example the storage tank client 325) would become inconsistent. If applications 215 can access the local file system 210 both directly and via a path through system 205, data consistency can't be guaranteed. Using the communications path of FIG. 6B insures single copy serializability, meaning that all accesses are serialized as if they were against a single copy of the data.

Direct access by applications 215 through the local file system 210 to the storage space 230 can be disallowed in several ways. Direct access can be disallowed administratively by mounting the local file system 210 in an unusual place such that applications 215 cannot find the local file system 210. Alternatively, access permission can be modified such that applications 215 cannot access the local file system 210. On some operating systems, the usage of the local file system 210 can be restricted to the virtual metadata server 245 and the virtual object storage server 250.

FIG. 7 is a diagram illustrating the name space view of the change to the computer system 200 introduced by system 205. In a conventional system configured as FIG. 1, applications 215 uses /data/documents; /data/documents might, for example, be where documents are stored on data storage 20, which is a certain disk device, for example, /dev/sda5. The function of the local file system 10 is to take device /dev/sda5 and map it to the file system namespace at /data/documents. After installing system 205, applications 215 continue to use /data/documents, the same file system namespace as before. The function of the storage tank client 235 is to have this file system namespace mapped to, not from a device, but from the virtual metadata server 245 and the virtual object storage server 250 in the virtual servers 240. As was previously presented, the storage tank client 235 has several options to present the storage tank name space such that applications can see it at /data/documents. The virtual servers 240 are using the same disk (/dev/sda5) via the local file system 210 on the storage space 230. If the disk /dev/sda5 needs to be mounted at a file system mount point, it can be mounted at an unusual place, such as /olddata/documents.

Figure 8:
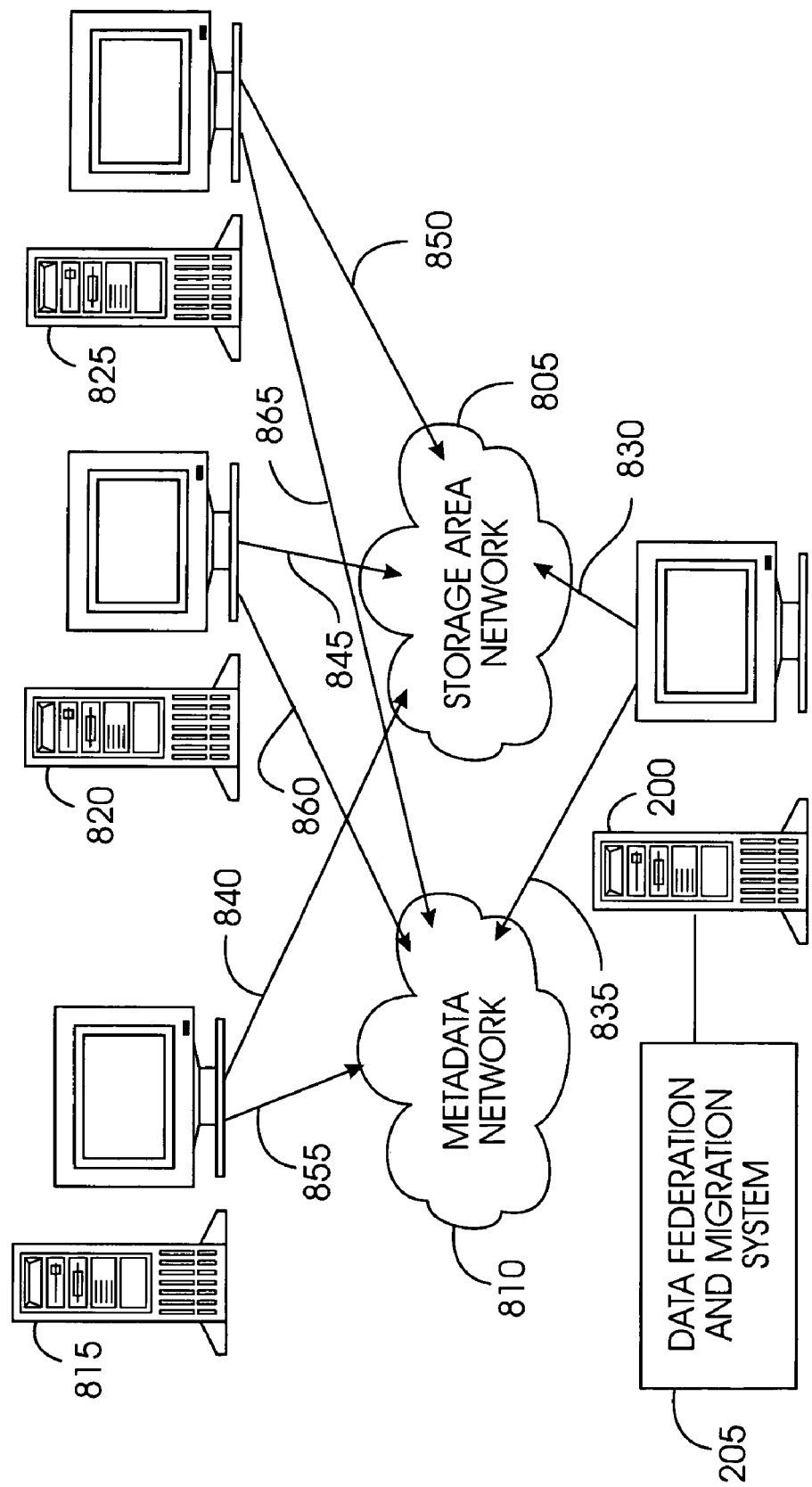
FIG. 8 is a diagram illustrating the networked environment in which a data federation and migration system of FIG. 2 may be used.

FIG. 8 portrays an exemplary overall environment in which system 205 may be used. System 205 is installed on the computer system 200. The storage area network 805 (SAN 805) may comprise communication lines and switches. The metadata network 810 also comprises communication lines and switches. Note that the distinction between the SAN 805 and the metadata network 810 is a logical distinction. The SAN 805 and the metadata network 810 can share a common infrastructure, and use the same communications links. Hosts 305 are represented by a variety of computers such as computers 815, 820, 825, and in the case of federation can access the computer system 200 for desired information through the SAN 805. The computer system 200 is connected to the SAN 805 via a communications link 830 such as a telephone, cable, or satellite link, and to the metadata network 810 by similar communications link 835. The hosts 815, 820, 825 can be connected via high-speed SAN network lines 840, 845, 850 to the SAN 805, and similarly via network lines 855, 860, 865 to the metadata network 810.

Through system 205, data on the computer system 200 may be federated into (accessed from), and migrated to the federation of computers 815, 820, 825. For example, computer system 200 may be an old machine with old storage disks (the disk A 220 and the disk B 225) and an old application, application 215. Application 215 needs to continue operating for a while, but the disk A 220 and the disk B 225 need to be retired because, for example, they are becoming unreliable, or the maintenance cost for such obsolete disks is increasing too rapidly, or they are power-inefficient and present an unacceptable load to the air conditioning system.

System 205 is installed on the computer system 200 and the data stored on the computer system 200 is migrated to other computers such as computers 815, 820, 825. Applications 215 continue operating while the data is migrating because the data is accessed wherever it is located via system 205. When all of the data has been migrated, the computer system 200 is shut down, old disks are disconnected, and new disks may be installed, if desired. The old data may be migrated back to the new disks using system 205. Alternatively, the applications 215 may be reinstalled on a new computer and the computer system 200 may be discarded. With the data on the computer system 200 already migrated, reinstalling just the applications 215 proceeds very quickly.

In an alternative embodiment, computers 815, 820, 825 may be other machines with processing or data storage capability such as appliances, for example. System 205 allows various types of machines and computers access to data stored only on the computer system 200.

In yet another embodiment, the data may be left on the computer system 200 after installation of system 205. In this case, the purpose of system 205 is federation only, i.e., to allow other machines or computers such as computers 815, 820, 825 access to the data on the computer system 200 without migrating the data.

In another embodiment, the data in the local file system 210 is exposed through block disks instead of through the object storage server style of protocols. This embodiment creates a virtual networked block disk by changing the local file system 210 to expose the data block or read the data block from the local file system 210. In this alternate embodiment, the virtual object storage server 250 is replaced by a virtual networked block disk server. This alternate embodiment does not realize the advantages of object server protocols, as previously presented.

While data is still on the computer system 200, remote applications such as applications 320 in the storage tank system 300 can access that data. In this fashion, the local file system 210 is federated into the storage tank system 210. If the intent of the user is only to migrate the data out of the existing system, administrative tools of the storage tank system 300 can disable such remote access or federation. Disabling remote access prevents the performance of the existing system from being negatively affected by remote access. Remote application 320 makes a file system I/O call to the kernel space 335. The storage tank client 325 contacts the virtual metadata server 245 for the desired file via the storage area network 355. System 205 obtains file metadata by accessing the local file system 210 at a different mount point. Application 320 contacts the virtual object storage server 250 for the file data, again via the storage area network 355. System 210 obtains the file data by accessing the local file system 205.

In yet another embodiment, the data federation and migration system may be used to move data from one file system to another file system in the same machine. For example, a user might wish to migrate data from an old damaged disk to a new disk.

In a further embodiment, the metadata protocol and the data protocol may be the same, for example a version of NFS that supports migration and redirection. In this case, the virtual metadata server 245 and the virtual object storage device 250 can be merged into a single virtual file server.

It is to be understood that the specific embodiments of the invention that have been described are merely illustrative of certain applications of the principle of the present invention.

Numerous modifications may be made to the system and method for federating a local file system into a distributed file system while preserving local access to the existing data in the local file system invention described herein without departing from the spirit and scope of the present invention. Moreover, while the present invention is described for illustration purpose only in relation to the storage tank system, is should be clear that the invention is applicable as well to, for example, other file systems, or other storage middleware, such as databases.

What is claimed is:

1. A processor-implemented method of federating a local file system into a distributed file system while preserving local access to an existing data in the local file system, comprising:
    adding a federation layer that allows both a local client and a plurality of distributed clients to access the existing data;
    allowing local applications to access both the existing data in the local file system and data in other parts of the distributed file system;
    wherein the federation layer establishes a detour between the local applications and the local file system, to provide access to the distributed file system;
    generating a unique object ID number for each object found in the local file system, as a tuple <I,G> of an mode number of the object found in the local file system and a generation number;
    wherein the generation number is increased anytime a same mode number is found for a different object;
    wherein the federation layer contains a database that stores the unique object ID number and that maps a file name and a corresponding unique object ID number; and
    maintaining a deleted flag in the database for objects that have been deleted, so the occurrence of the same mode number for different objects are recognized.

2. The method of claim 1, wherein the federation layer comprises a virtual server that serves file data and metadata from the local file system to the distributed file system.

3. The method of claim 2, wherein the virtual server comprises:
    a virtual metadata server that serves file metadata;
    a virtual storage server that serves file content; and
    wherein the virtual metadata server and the virtual storage server serve data from the local file system to the distributed file system.

4. The method of claim 3, wherein the virtual storage server is a virtual object storage server.

5. The method of claim 4, further comprises installing the virtual object storage server in the local file system.

6. The method of claim 3, further comprises installing the virtual metadata server in the local computer file system.

7. The method of claim 2, wherein the federation layer contains a distributed file system client for transferring and translating communications from a local application on the local computer system to the virtual server.

8. The method of claim 7, further comprises installing the distributed file system client in the local file system.

9. The method of claim 7, further comprises using a shared memory between the distributed file system client and the virtual server to enhance communication between the distributed file system client and the virtual server.

10. The method of claim 7, further comprises moving the virtual server into a kernel space for efficiency purpose.

11. The method of claim 2, further comprises installing the virtual server in the local file system.

12. The method of claim 2, further comprises configuring the virtual server to communicate with the distributed file system.

13. The method of claim 12, further comprises:
    temporarily disconnecting the local applications on the local file system; and
    reconfiguring the local applications to communicate with the distributed file system.

14. The method of claim 1, further comprises generating the unique object ID number by counting the objects that were found in the local file system.

15. A processor-implemented method of federating a local file system into a distributed file system while preserving local access to an existing data in the local file system, comprising:
    adding a federation layer that allows both a local client and a plurality of distributed clients to access the existing data;
    allowing local applications to access both the existing data in the local file system and data in other parts of the distributed file system;
    wherein the federation layer establishes a detour between the local applications and the local file system, to provide access to the distributed file system;
    wherein the federation layer contains an object ID database for mapping between a file name and a unique object ID number;
    assigning the unique object ID number to each object found in the local file system;
    detecting multiple hard links to a same file by comparing an mode number of files;
    upon determination that one file has more than one hard link, using the same unique object ID number for the multiple names for that object; and
    upon determination that the file has one hard link that has been removed, then deleting the object when the one hard link has been unlinked.

16. A computer program product having instruction codes stored on a computer-usable storage medium for federating a local file system into a distributed file system while preserving local access to an existing data in the local file system, comprising:
    a set of instruction codes for adding a federation layer that allows both a local client and a plurality of distributed clients to access the existing data;
    a set of instruction codes for allowing local applications to access both the existing data in the local file system and data in other parts of the distributed file system; and
    wherein the federation layer establishes a detour between the local applications and the local file system, to provide access to the distributed file system;
    a set of instruction codes for generating a unique object ID number for each object found in the local file system, as a tuple <IG> of an mode number of the object found in the local file system and a generation number;
    a set of instruction codes for increasing the generation number anytime a same mode number is found for a different object;
    wherein the federation layer contains a database that stores the unique object ID number and that maps a file name and a corresponding unique object ID number;
    the database storing a deleted flag for objects that have been deleted, so the occurrence of the same mode number for different objects are recognized; and
    a user interface for providing the local access to the existing data in the local file system, using the deleted flag in the database.

17. The computer program product of claim 16, wherein the federation layer comprises a virtual server that serves file data and metadata from the local file system to the distributed file system.

18. The computer program product of claim 17, wherein the virtual server comprises:
a virtual metadata server that serves file metadata;
a virtual storage server that serves file content; and
wherein the virtual metadata server and the virtual storage server serve data from the local file system to the distributed file system.

19. The computer program product of claim 18, wherein the virtual storage server is a virtual object storage server.

20. The computer program product of claim 19, further comprises a set of instruction codes for installing the virtual object storage server in the local file system.

21. The computer program product of claim 19, further comprises a set of instruction codes for installing the distributed file system in the local file system.

22. The computer program product of claim 18, further comprises a set of instruction codes for installing the virtual metadata server and a virtual file in the local file system.

23. The computer program product of claim 17, wherein the federation layer contains a distributed file system client for transferring and translating communications from a local application on the local file system to the virtual server.

24. The computer program product of claim 17, further comprises a set of instruction codes for installing a file server in the local file system.

25. The computer program product of claim 17, further comprises a set of instruction codes for configuring a file server to communicate with the distributed file system.

26. The computer program product of claim 25, further comprises:
a set of instruction codes for temporarily disconnecting the local applications on the local file system; and
a set of instruction codes for reconfiguring the local applications to communicate with the distributed file system.

27. A computer system for federating a local file system into a distributed file system while preserving local access to an existing data in the local file system, comprising:
an addition of a federation layer that allows both a local client and a plurality of distributed clients to access the existing data;
an allowance of local applications to access both the existing data in the local file system and data in other parts of the distributed file system;
wherein the federation layer establishes a detour between the local applications and the local file system, to provide access to the distributed file system;
a generation of a unique object ID number for each object found in the local file system, as a tuple <IG> of an mode number of the object found in the local file system and a generation number;
wherein the generation number is increased anytime a same inode number is found for a different object;
wherein the federation layer contains a database that stores the unique object ID number and that maps a file name and a corresponding unique object ID number;
wherein the database stores a deleted flag in the database for objects that have been deleted, so the occurrence of the same mode number for different objects are recognized; and
a user interface for providing the local access to the existing data in the local file system, using the deleted flag in the database.

28. The computer system of claim 27, wherein the federation layer comprises a virtual server that serves file data and metadata from the local file system to the distributed file system.

29. The computer system of claim 28, wherein the virtual server comprises:
a virtual metadata server that serves file metadata;
a virtual storage server that serves file content; and
wherein the virtual metadata server and the virtual storage server serve data from the local file system to the distributed file system.

30. The computer system of claim 29, wherein the virtual storage server is a virtual object storage server.

31. The computer system of claim 30, further comprises an installation of the virtual object storage server in the local file system.

32. The computer system of claim 29, further comprises an installation of the virtual metadata server and a file server in the local file system.

33. The computer system of claim 28, wherein the federation layer contains a distributed file system client for transferring and translating communications from a local application on the local file system to the virtual server.

34. The computer system of claim 33, further comprises an installation of the distributed file system in the local file system.

35. The computer system of claim 28, further comprises an installation of a file server in the local file system.

* * * * *